Oct. 23, 1934.  L. L. HAAS  1,978,195

CLAMP BAND

Filed Oct. 21, 1933

INVENTOR
Lucien L. Haas
by Parker, Prochnow & Farmer
ATTORNEYS.

Patented Oct. 23, 1934

1,978,195

UNITED STATES PATENT OFFICE 1,978,195

CLAMP BAND

Lucien L. Haas, Buffalo, N. Y., assignor to Buffalo Pressed Steel Company, Buffalo, N. Y.

Application October 21, 1933, Serial No. 694,593

8 Claims. (Cl. 24—19)

This invention relates to improvements in clamp bands.

The objects of this invention are to provide a clamp band which, when tightened about a cylindrical body, exerts a uniform radial pressure on all parts of the cylindrical body; also to provide a clamp band which may be tightened about a tubular member in such a manner as to prevent buckling of any portion of the tubular member; also to provide a clamp band of this kind comprising two parts, the inner part being provided with edge portions arranged to prevent the formation of a gap extending lengthwise of the cylindrical surface which the clamp band engages; also to provide a clamp band comprising an outer adjustable, partly cylindrical portion having a gap to permit adjustment thereof, and an inner member having parts which extend across said gap to bridge the same in such a manner that the inner surface of the inner member forms a cylindrical surface; also to improve the construction of clamp bands in other respects hereinafter specified.

This invention is applicable to clamp bands intended for various uses in which a cylindrical or tubular body is to be clamped. This clamp band has been found to be particularly desirable for use in connection with the securing of pipes to mufflers to form a substantially gas tight connection, to prevent the escape of exhaust gases at such connection. It will be understood, however, that it is not intended to limit the use of this clamp band to mufflers.

A represents an end portion of a muffler and B a pipe to be connected therewith, such as an exhaust or tail pipe. The muffler A is provided with the usual tubular extension C which may be split as indicated at D, Fig. 2, and which in the construction shown is of such size as to permit the pipe B to be inserted into the tubular extension.

Figure 1:
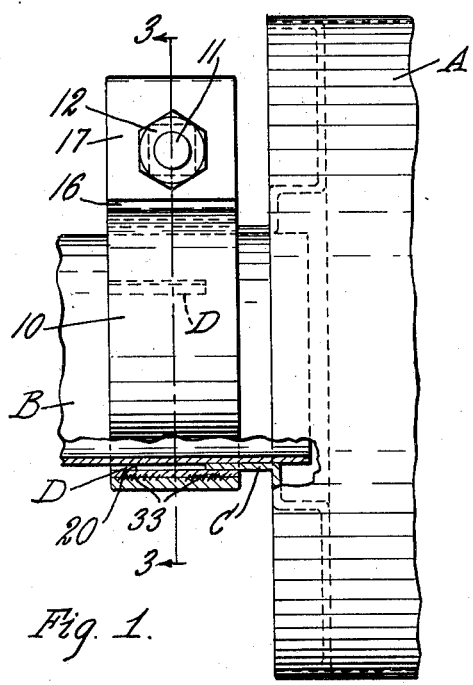
Fig. 1 is a side view of a clamp band embodying this invention partly in section, showing the same applied to a muffler for connecting a pipe thereto.
Figure 2:
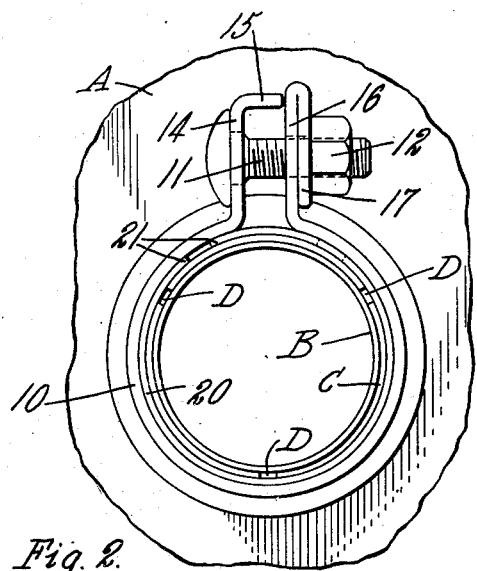
Fig. 2 is an end view thereof.
Figure 3:
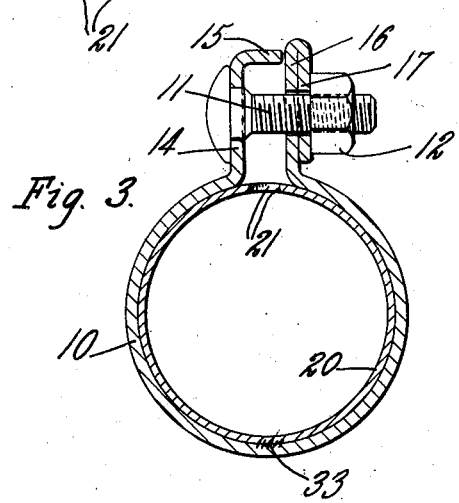
Fig. 3 is a section thereof, on line 3—3, Fig. 1.

The clamp band includes an outer member 10 which, as shown in Figs. 1 to 3, is of substantially cylindrical form and is provided with outwardly extending end portions which are spaced apart and provided with apertures so that a bolt 11 may pass through the apertures, a nut 12 being provided for drawing the ends of the outer member of the band toward each other to contract the band. The gap between the two outwardly extending end portions of the outer member is consequently necessary in order to permit this contraction of the clamping member, and a clamping member comprising only this outer part has the objection that pressure is applied to all parts of the cylindrical or tubular body to which the band is applied, excepting at the gap. When such a clamping member is applied to two tubular members for securing the same together, the outer tubular member, if sufficient pressure is applied, will buckle at the gap, thus forming a groove or space in this member through which the fluid within the tubular members may escape. When such a single piece clamp is used on exhaust mufflers, exhaust gases can escape between the buckled portion of the tubular extension of the muffler and the pipe B which is very objectionable and which may be dangerous.

This invention includes improvements in the outwardly extending end portions of clamp bands and such improvements include providing an outwardly extending portion with some means to limit the extent to which the outwardly extending portions may be drawn toward each other. In the construction shown, the outwardly extending portion 14 has a bent-over portion 15 which is adapted to engage the other outwardly extending part 16 of the clamping band. This outward extension 16 is preferably of double thickness, this being accomplished by bending back a portion of the end of the extension so that the same lies flatly against the outer face of the extension as indicated at 17, thus reinforcing the extension. When pressure is applied by tightening the nut 12, the lateral part 15 of the extension 14 will engage the other extension so that bending of the extension 14 at its juncture with the cylindrical body portion of the outer member will be prevented. Further movement of the extensions toward each other after the part 15 engages the extension 16 will result in a greater movement of the portion of the extension adjacent to the cylindrical part of the outer member 10. Furthermore, the bent part 15 of the extension 14 makes it possible to exert greater force upon the cylindrical portion of the outer member 10 to contract the same.

Figure 4:
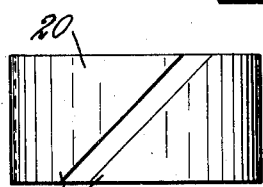
Fig. 4 is a side view of the inner member of the clamp band detached from the outer member.

In order to close the gap between the outwardly projecting ends of the outer member, one or more inner members 20 are provided, each of which may be in the form of a split ring, and a part of one of these split rings is arranged to extend across the gap in the outer member. In the construction illustrated in Figs. 1, 3 and 7, one such member 20 is employed. This inner member is further formed so that the ends thereof do not overlap in such a manner as to form another gap or break in the inner cylindrical surface of the inner member or split ring 20, which in turn would form a corrugation or buckle in the tubular member engaged by the clamping band, resuting in a leak. In order to avoid this objection, the ends 21 of the split ring are formed so as to overrun each other without overlapping, so that all parts of the inner surface of the split ring may be equidistant from the axis of this cylindrical surface. In the particular form shown in Figs. 1 to 4, the adjacent end edges of the inner member of the clamping band extend diagonally or at an angle to the length of the inner member. By means of this construction, the gap between the ends of the inner member, which is necessary for purposes of adjustment, extends diagonally of the axis of the tubular member, or spirally on its surface. A tubular member to which the clamping band is applied may buckle in a direction parallel to the axis of the cylindrical surface of the tubular member but it is impossible by means of a clamping band such as shown to produce a buckling extending at an angle to the axis of such cylindrical surface. Consequently, by providing the clamping band with a split ring in which the ends 21 overrun each other as shown in Fig. 4, the buckling or deformation out of the cylindrical form is entirely prevented, and consequently with a clamp band of the kind shown, a gas and liquid tight joint can be formed between two tubular members.

Figure 5:
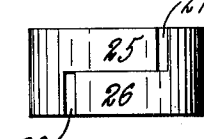
Figs. 5 and 6 are side views of inner members of clamp bands of modified construction, on a reduced scale.
Figure 6:
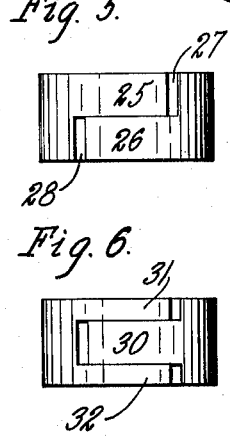

In Figs. 5 and 6 are shown modified forms of inner members or split rings in which the ends of the inner member are formed in such a manner that the gap between the ends of the split ring is staggered or divided so that it extends only partly across the inner member at any portion thereof. In Fig. 5, the ends of the inner member are provided with extensions 25 and 26 which overrun each other or lie side by side, the end of the extension 25 forming with the other end of the inner member a gap 27 extending only partly across the inner member and a similar gap 28 is formed at the end of the extension 26. Conseuently, when this type of inner member is used, if any buckling of the tubular member to which the clamp band is applied results at this gap, such buckling could only extend through a part of the length of the inner member, and similarly any buckling caused by the gap 28 would only extend partly across the inner member. Because of the continuous cylindrical surface of the inner member between the two gaps 27 and 28, there would be no connection between such two buckled parts of the tubular extension C or other member engaged by the clamp band and consequently, there can be no leakage through such buckled portions.

In Fig. 6 the inner split ring is provided at one end thereof with a central extension 30 and the other end of the inner member is provided with extensions 31 and 32 lying at opposite sides of the extension 30, the extensions of the two ends overrunning each other. As has already been explained in connection with Fig. 5, the gaps between the ends of the inner member are thus staggered so that no buckling of the tubular body engaged by the clamp band can result in a leak.

Figure 8:
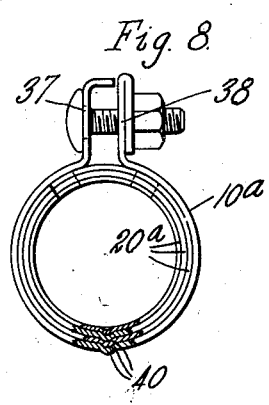
Fig. 8 is an end view, on a reduced scale and partly in section, of still another modified form of clamp band.

In the modified clamping band shown in Fig. 8 there is provided a plurality of inner clamping members 20a nested or arranged concentrically one within the other. By this arrangement a clamp band of a given size may be attached to pipes or parts of varying diameters, thus reducing the number of sizes in which it would be necessary to stock the clamp bands. Furthermore, these inner members can be made of various thicknesses so that by proper selection of one or more of these rings, a great variety of different internal diameters can be provided for properly fitting the particular work in hand.

The inner members or split rings may be arranged in and prevented from detachment from the outer or clamping member of the clamp band in various ways. For example, the inner and outer members may be permanently secured together by welding or other suitable means as indicated at 33, see Figs. 1 and 3, and preferably this connection between the two members is remote from the gap or opening of the outer member. The gaps between the ends of the inner member are preferably arranged near the gap in the outer member so as to facilitate the operation of the clamp band.

The inner member or members, however, may be removably arranged within the clamp band, if desired. An example of such an assembly is shown in Fig. 8 wherein the outer clamping member 10a and the several inner split rings or members 20a are each provided with interfitting parts such as depressions or blisters 40, or the like. In this way the inner members are prevented from endwise displacement from the outer member, while at the same time the assembling of the necessary number of inner rings within the outer member is facilitated.

Figure 7:
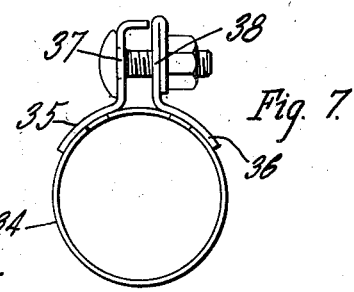
Fig. 7 is an end view of a clamp band of modified construction, on a reduced scale.

In the modified construction of Fig. 7, there is shown an inner member or split ring 34 similar to those already described, but the outer or clamping member does not extend entirely around the member to be clamped. In the construction illustrated, this member comprises two segmental parts 35 and 36, which are welded or otherwise rigidly secured to the split ring 34. The segmental parts 35 and 36 have outwardly extending lugs 37 and 38 with which a bolt or other pressure applying means may cooperate.

Each of the clamp bands described has the advantage of being capable of forming a gas tight closure between two tubular members and is capable of exerting great clamping pressure upon the outer tubular member in all radial directions, thus retaining the tubular member which it engages in truly cylindrical form. The clamp band described not only closes the gap in the outer clamping member but also is so constructed that the ends of the inner members or split rings overrun each other and consequently, do not overlap by lying one within the other, which would produce a break in the continuity of the inner cylindrical surface of the inner member, within which break the tubular member engaged by the clamp band could buckle to form a leak. Furthermore, the clamp band is so constructed that during the compressing or clamping action there is practically no movement of the inner member relatively to the outer member, except at the overrunning ends, so that very little friction results during the tightening of the clamp, which in turn results in a very effective application of clamping pressure by the clamp band. The clamp band, furthermore, is inexpensive to construct and has greater strength and more flexibility than it would have if made in a single piece. If, for example, during the formation of the outer member, this member should be slightly out of round, no harm will result, since the inner members, which in the construction shown are made of thinner material than the outer member, and which, consequently, can be readily made more truly round, will compensate for any imperfections in the outer member. By making the clamp band in parts which are either unconnected or else connected only at one point, the clamp band has materially greater flexibility without loss of strength, than it would have if made of a single piece.

I claim as my invention:

1. A clamp band including an outer member having outwardly extending portions forming between them a gap, means connecting said portions to draw them together to contract said outer member, and an inner member extending across said gap and having its ends arranged adjacent to said gap and overrunning each other and spaced equidistant from a common axis.

2. A clamp band including an outer member having outwardly extending portions forming between them a gap, means connecting said portions to draw them together to contract said outer member, and a split ring arranged within said outer member and having its ends overrunning each other and arranged equidistant from a common axis, said ring being secured to said outer member at a distance from said ends.

3. A clamp band including an outer member having outwardly extending portions forming between them a gap, an inner member extending across said gap and having end portions spaced apart to form a diagonally extending gap across said inner member.

4. A clamp band including an outer member having outwardly extending portions forming between them a gap to permit contraction of said outer member, an inner split ring having portions extending across said gap and having its ends spaced apart to form between them a diagonal gap.

5. A clamp band including an outer member having outwardly extending portions forming between them a gap, an inner member having end portions arranged to overrun each other, said end portions being spaced apart to form a staggered arrangement of gaps between different parts of said end portions.

6. A clamp band including a split ring having its ends overrunning each other and arranged equidistant from a common axis, parts secured to said split ring adjacent to the end portions thereof, and means for engaging said parts to draw the same together to contract said ring.

7. A clamp band including an outer member having outwardly extending portions forming between them a gap, means connecting said portions to draw them together to contract said outer member, a split ring arranged within said outer member and having its ends overrunning each other and arranged equidistant from a common axis, and a restricted, permanent connection between said ring and said outer member arranged at a distance from the ends of said ring to permit said ring to contract with said outer member.

8. A clamp band including an outer member having outwardly extending portions forming between them a gap, means connecting said portions to draw them together to contract said outer member, a split ring arranged within said outer member and having its ends overrunning each other and arranged equidistant from a common axis, and said ring and said outer member having interfitting parts acting to releasably retain them in assembled relation, and whereby rings of different thicknesses may be substituted one for another to enable the clamp band to be used on members of different diameters.

LUCIEN L. HAAS.